July 24, 1962
S. LEES
3,045,780
ROTARY VISCOUS DAMPER
Filed Oct. 18, 1957
2 Sheets-Sheet 1
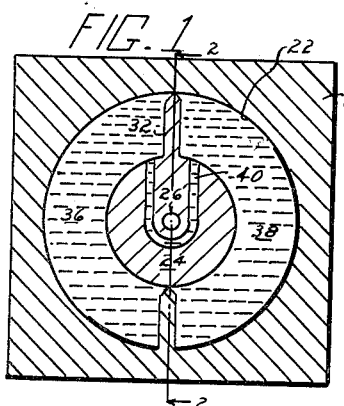
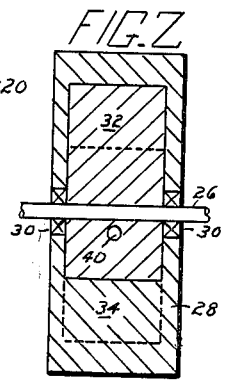
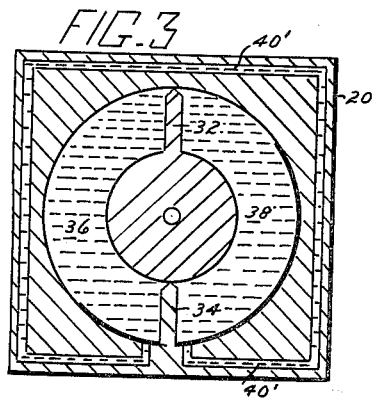
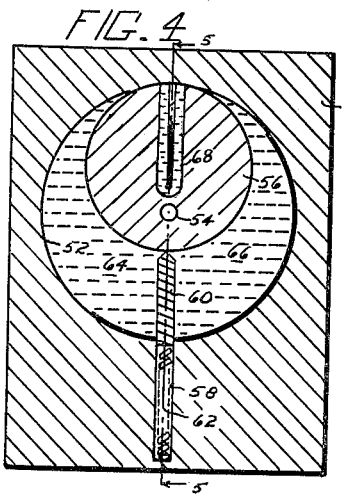
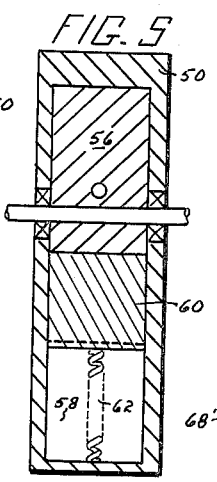
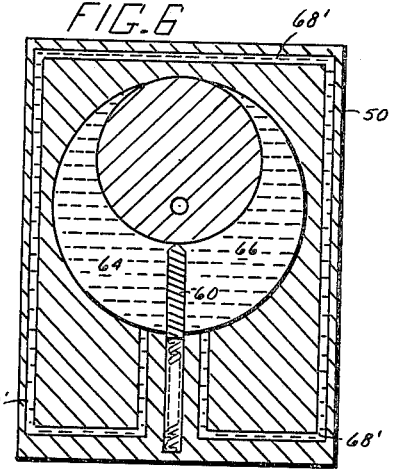
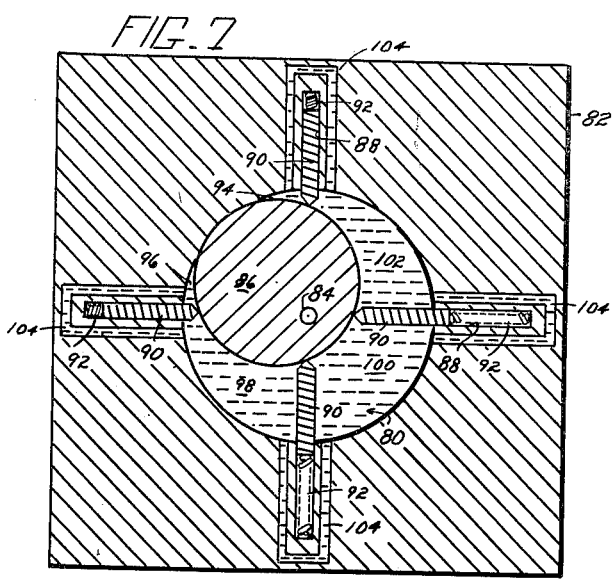
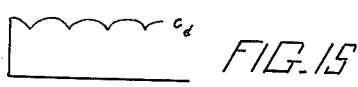
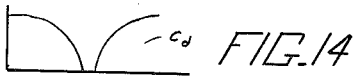
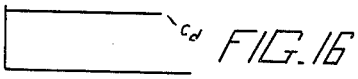
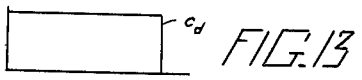
INVENTOR.
BY Sidney Lees
George L. Greenfield
his atty July 24, 1962

S. LEES 3,045,780

ROTARY VISCOUS DAMPER

Filed Oct. 18, 1957

INVENTOR.
Sidney Lees
BY George L. Greenfield
his atty

United States Patent Office 3,045,780
Patented July 24, 1962

3,045,780
ROTARY VISCOUS DAMPER
Sidney Lees, 544 Walnut St., Newton, Mass.
Filed Oct. 18, 1957, Ser. No. 691,103
1 Claim. (Cl. 188—90)

This invention relates to dampers and more particularly comprises a new and improved rotary viscous damper having a wide range of applications.

One important object of my invention is providing a viscous damper which can be connected to any rotating body to introduce a desired characteristic into the velocity of rotation of that body. More particularly, it is desired to provide a viscous damper which can be connected to measuring instruments when damping is required.

Another important object of my invention is to provide a viscous damper having either a constant or a changing viscous damping coefficient.

Another important object of my invention is to provide a viscous damper which may be adjusted to vary its viscous damping coefficient.

Still another important object of my invention is to provide a viscous damper which is small and compact and which is relatively inexpensive to manufacture.

To accomplish these and other objects, a number of embodiments of my invention include among their important features a cylindrical cavity formed in a case and which contains a rotor adapted to rotate about the axis of the cavity. Either the rotor itself or some partition connected to it engages the inner cylindrical wall of the cavity and forms a moving seal with that wall. A second partition connected to the inner cylindrical wall of the cavity forms a seal against the surface of the rotor. The two partitions together divide the cavity into two distinct chambers and each is filled with a viscous liquid. Thus, in the absence of some other passage which interconnects the two chambers, rotation of the rotor in the cavity would be prohibited. However, such a duct is formed either in the rotor itself or in the case of the instrument and provides a restricted passage between the two chambers. As a result rotation of the rotor forces the liquid flow through the restricted passage from one chamber to the other.

It can be demonstrated mathematically that the viscous damping coefficient in such a device is a function of the length of the restricted passage, the viscosity of the liquid and the ratio of the squares of the effective cross sectional areas of the restricted passage and the cavity. Thus, any means introduced into a damper which provides for adjustment of any of these functions will allow for changes to be made in the viscous damping coefficient of the device. In my co-pending application Serial No. 659,962 I have described in detail the formula for the viscous damping coefficient.

These and other objects and features of my invention will be better understood and appreciated from the following detailed description of a number of embodiments thereof, selected for purposes of illustration and shown in the accompanying drawings in which FIGURE 1 is a diagrammatic cross sectional view of a viscous damper constructed in accordance with my invention;

FIGURE 2 is a cross sectional view taken along the corresponding section line of FIGURE 1;

FIGURES 3 and 4 are diagrammatic cross sectional views of two additional embodiments of my invention;

FIGURES 5 is a cross sectional view taken along the corresponding section line in FIGURE 4;

FIGURES 6, 7 and 8 are diagrammatic cross sectional views of still other embodiments of my invention;

Figure 11:
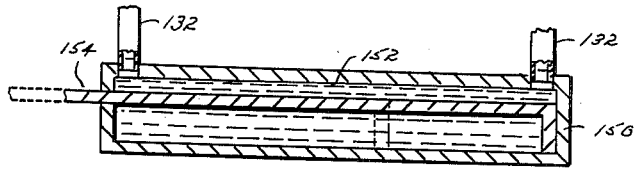
Figure 12:
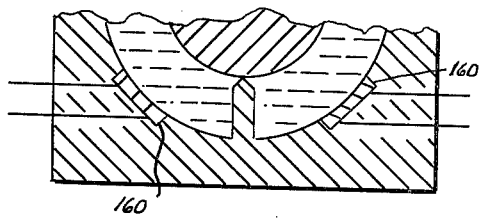

FIGURES 11 and 12 are fragmentary cross sectional views of additional means for varying the viscous damping coefficient; and FIGURES 13, 14, 15 and 16 are graphs of the viscous damping coefficient of the embodiments of my invention shown in FIGURES 1 and 3, 4 and 6, 7 and 8 for one revolution of the rotor or impeller.

The embodiment of my invention shown in FIGURES 1 and 2 includes in its general organization a case 20 having a cylindrical cavity 22 formed in its interior and in which a rotor 24 is mounted for rotation on a shaft 26. The shaft is supported for rotation in the end walls 28 of the case 20 by sealed bearings 30 disposed in those walls.

It will be noted in FIGURE 2 that the rotor 24 extends the full length of the cavity and carries a radially extending partition 32 which also extends throughout the length of the cavity. The free outer end of the partition engages the inner cylindrical wall of the cavity and slides about that wall as the rotor is driven by the shaft 26. A stationary partition 34 is formed on the inner cylindrical wall of the cavity and extends to and engages the cylindrical surface of the rotor. The partition 36 also extends the full length of the cavity and slides on the surface of the rotor as the rotor is driven by its shaft.

An inspection of FIGURE 1 reveals that the partitions 32 and 34 divide the cavity 22 into two separate and distinct chambers 36 and 38. Rotation of the rotor 24 and its partition 32 causes the capacity of each chamber to vary. For example, if the rotor 24 is turned in a counterclockwise direction, as viewed in FIGURE 1, the chamber 36 will become smaller while the chamber 38 increases in volume. Each of the chambers 36 and 38 along with a passage 40 formed in the rotor and which interconnects the two chambers as a bypass about the partition 32 is completely filled with a viscous liquid. As a result, rotation of the rotor 24 causes a part of the liquid contained in one chamber to flow through the restricted passage 40 and into the other chamber as the volume of each varies.

The embodiment of my invention shown in FIGURE 1 has a constant viscous damping coefficient throughout its full operating range of somewhat less than 360°. Thus, the instrument is well suited for use as a damper with any measuring instrument whose rotation is less than 360°. The viscous damping coefficient remains constant because barring some additional features the viscosity of the liquid is constant, the length of the restricted passage 40 is constant, and the ratio of the squares of the effective cross sectional areas of the passage and chambers is constant. To introduce the damper into a system, it is only necessary to connect either the shaft 26 or the case 20 to the rotating body and secure the other of these members against rotation.

The embodiment of my invention shown in FIGURE 3 is substantially identical to that shown in FIGURES 1 and 2. However, the restricted passage 40 shown in the first embodiment as formed in the rotor 24 is rather formed in the case 20 and interconnects the two chambers 36 and 38 adjacent the base of the fixed partition 34. The viscous damper performs in exactly the same manner as the preceding embodiment and requires no further description. The showing of FIGURE 3 merely illustrates that the particular location of the passage 40 or 40' is a matter of choice.

While the embodiments of my invention illustrated in FIGURES 1 and 3 are only suited for use with instruments whose rotation is limited to less than 360°, the embodiment of my invention illustrated in FIGURES 4 and 5 may be used with instruments whose rotation is unlimited. In detail, this embodiment includes a case 50 within which is formed a cylindrical cavity 52. A shaft 54 extends coaxially through the chamber 52 and carries an eccentrically mounted rotor 56. The rotor 56 slides about the inner surface of the cavity 52 and performs exactly the same function as the movable partition 32 in the previously described embodiments. A recess 58 formed in the case 50 is adapted to receive a partition 60 which is biased by a spring 62 out of the recess. The spring 62 urges the partition 60 to engage the side of the rotor 56 and moves in and out of the recess 58 in response to the cam action of the surface of the rotor. Thus, when the rotor 56 is in the position shown in FIGURE 4, the partition 60 under the influence of the spring 62 lies substantially fully out of the recess. However, when the rotor 56 is turned 180° from the position shown, the partition 60 is pushed all the way in to the recess so as not to impede rotation of the rotor. The partition 60 and the point of contact between the rotor and the inner cylindrical wall of the cavity define two distinct chambers 64 and 66 in the cavity and communication between these chambers is provided by a restricted passage 68 formed in the rotor.

From the foregoing description it will be appreciated that rotation of the rotor 56 will cause fluid to flow from one of the chambers 64 or 66 through the restricted passage 68 into the other of the chambers. The viscous damping coefficient of the device is constantly changing because although the length of the passage 68 and the viscosity of the liquid 70 which fills the chambers and passage remains constant, the ratio of the squares of the effective cross sectional areas of the passage 68 and the chambers varies as the rotor is turned. In FIGURE 14 I have illustrated graphically the manner in which the viscous damping coefficient varies through one revolution of the rotor.

In operation, either the shaft 54 or the case 50 is connected to the rotating body and the other of these elements is fixed. With this device a constantly changing viscous damping characteristic will be introduced into the velocity of the rotating body.

The embodiment of my invention shown in FIGURE 6 is substantially identical to that shown in FIGURES 4 and 5 except that the restricted passage 68' is formed in the case 50 and is substituted for the restricted passage 68 formed in the rotor of the previous embodiment. In all respects this embodiment operates in the same manner as that shown in FIGURE 4.

The embodiment of my invention shown in FIGURE 7 is suited for use with an instrument whose rotation is more than 360° and wherever it is desired to introduce a viscous damping coefficient which approaches a constant. In effect, this embodiment of my invention is a multiplication of the embodiment shown in FIGURE 6. In detail, a cylindrical cavity 80 is formed in a case 82 and a shaft 84 which extends coaxially through the cavity supports an eccentric rotor 86. The rotor 86 slides about the interior wall of the cavity upon rotation of the shaft. Four recesses 88 radiate outwardly from the cavity 80 and slidably receive partitions 90 which are biased out of the recesses by springs 92. The springs 92 urge the partitions into engagement with the cylindrical surface of the rotor 86 and each moves in and out of its recess as the rotor is driven by the shaft. The four partitions 90 and the line contact between the rotor 86 and the cylindrical surface of the cavity 80 divide the cavity into five distinct chambers 94, 96, 98, 100 and 102. Restricted passages 104 bypass each of the partitions 90 and permit the viscous liquid which fills the cavity and the passages to move from one chamber to another upon rotation of the rotor 86. Thus, when the rotor as viewed in FIGURE 7 rotates in a counterclockwise direction, chambers 96, 98 and 100 decrease in volume while chambers 102 and 94 increase in size. Thus, the fluid in the chambers 96, 98 and 100 will flow in a generally counterclockwise direction through the restricted passages 104 to the chambers 102 and 94. With this device the viscous damping coefficient takes the form illustrated graphically in FIGURE 15. It is obvious that by increasing the number of partitions and with them the number of bypass passages, the viscous damping coefficient approaches a constant or straight line in the graph.

Figure 8:
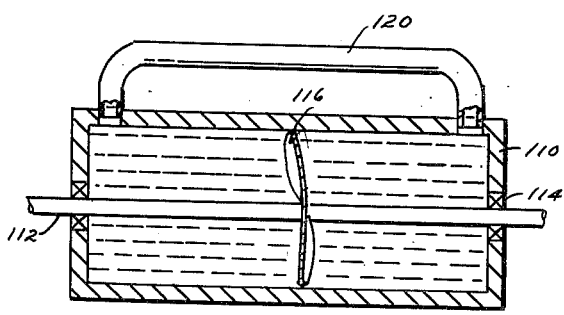

The embodiment of my invention shown in FIGURE 8 is adapted to render a constant viscous damping coefficient and may be used with all types of rotating bodies, that is, whether they rotate more or less than 360°. In this embodiment a case 110 which may be cylindrical in form carries coaxially a shaft 112 which is mounted in sealed bearings 114. A fan type pump 116 is carried by and rotates with the shaft 112 and is adapted to circulate a viscous liquid 118 through the case and a restricted passage 120 connected to the case on each side of the pump. This extremely simple embodiment of my invention has a constant viscous damping coefficient as shown graphically in FIGURE 16 and is readily connected to any rotating body in the manner of the other embodiments of my invention. Unlike the other embodiments, however, there is no positive displacement of the viscous liquid and thus the magnitude of the coefficient in most cases is less than that which may be derived from the other embodiments. Nevertheless, its simplicity makes it a most suitable device.

Figure 9:
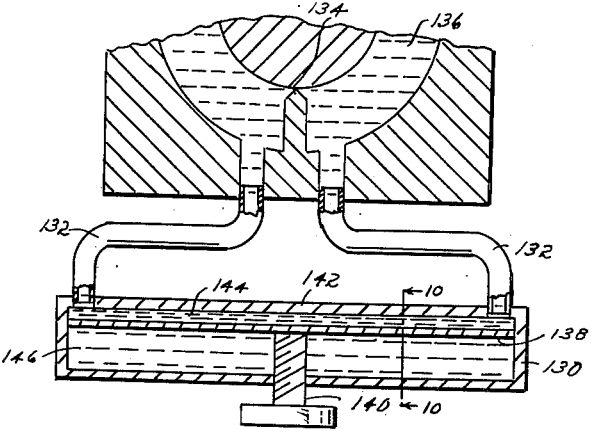
FIGURE 9 is a fragmentary cross sectional view of means for varying the viscous damping coefficient of any of the embodiments of my invention illustrated in the preceding figures.
Figure 10:
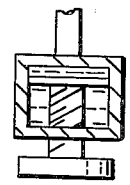
FIGURE 10 is a cross sectional view taken along the corresponding section line in FIGURE 9.

As suggested in the introduction, it is very desirable that a viscous damper include means for varying the viscous damping coefficient. Three such devices are shown in FIGURES 9–12. In FIGURES 9 and 10, I have illustrated a device for varying the ratio of the squares of the effective cross sectional areas of the cavity and the restricted passage. This device includes a casing 130 which is connected by means of conduits 132 to each side of the fixed partition 134 disposed within the cavity 136 of the damper. The damper itself may be identical to that shown in any of the preceding figures and it is only necessary that the conduits 132 interconnect the independent chambers formed within the cavity. If this device were to be used with the embodiment of my invention shown in FIGURE 3, the casing 130 and the conduits 132 together would replace the restricted passage 40'. Disposed within the case 130 is a movable plate 138 whose position is controlled by a screw 140. The plate 138 and the wall 142 of the casing 130 define a restricted passage 144 through which the viscous liquid must flow when the rotor of the damper is turned. It is obvious that the cross sectional area of the restricted passage 144 may be varied by moving the plate 138 toward or away from the wall 142. Because the chambers in the damper, the conduits 132 and the restricted passage 144 must be completely filled with the viscous liquid for the device to operate properly, it is necessary to permit the liquid to pass between the passage 144 and the lower portion 146 of the casing 130 when changes are made in the position of the plate. A very small opening formed in the plate 138 to be opened when the plate is adjusted or a less than perfect fit between the periphery of the plate and the walls of the casing 130 will accomplish this. It will be recognized that by the use of the device shown in FIGURES 9 and 10, the ratio of the squares of the cross sectional areas of the chambers and restricted passage may be varied and thus the viscous damping coefficient of the assembly may be controlled.

In FIGURE 11, I have illustrated a device for changing the effective length of the restricted passage. This device may be connected to the conduits 132 of FIGURE 9 which in turn connect the extreme ends of the casing 150 to the separate chambers in the cavity of the damper.

The effective length of the restricted passage 152 formed in the casing 150 is varied by moving the plate 154 translationally as suggested by the broken lines. By moving the plate 154 to the left as shown in the figure, the restricted portion of the bypass about the partition in the damper cavity is reduced in length and this, of course, varies the viscous damping coefficient of the entire assembly.

In FIGURE 12, heating coils 160 are illustrated diagrammatically in the wall of the cavity. Because the viscosity of the liquid varies with temperature, the viscous damping coefficient of the entire device may be controlled and varied by changing the temperature of the heating units.

It will be recognized that in each embodiment of my invention, the damper includes a closed and continuous fluid path or passage and the damping action is accomplished by circulating the viscous liquid through it. Those skilled in the art will appreciate that numerous modifications may be made of my invention without departing from its spirit. Therefore, I do not intend to limit the scope of my invention to the specific embodiments illustrated and described but rather it is my intention that the breadth of my invention be determined by the appended claim and their equivalents.

The invention disclosed herein has many applications. For example, the embodiment of my invention shown in FIGURE 7 in combination with the means for varying the viscous damping coefficient shown in FIGURE 9 lends itself for use in a brake assembly. The rotor 86 in such an application may be connected to a rotating shaft whose speed is to be controlled and the plate 138 may be actuated by some convenient device such as a foot pedal or lever. Merely by moving the plate in the direction of the wall 142 and thus reduce the cross sectional area of the passage 144 effective braking of the speed of rotation of the shaft will be accomplished. Those skilled in the art will recognize that the various embodiments of my invention may be used just as effectively in other settings.

What I claim as new and desire to secure by Letters Patent of the United States is:

A rotary damper comprising means defining a closed continuous passage with a portion of the passage having a restricted cross sectional area, a liquid filling the passage, means mounted for rotation in an unrestricted portion of the passage and causing the liquid to circulate through the passage in response to its rotation, and means including a movable plate disposed in the restricted portion of the passage for varying its effective cross sectional area to vary the ratios of the cross sectional areas of the restricted and unrestricted portions of the passage, said plate and restricted portion of the passage being of substantial length and comprising a major portion of the length of said passage.

References Cited in the file of this patent

UNITED STATES PATENTS

| | | |
|---|---|---|
| 1,313,763 | Thomas | Aug. 19, 1919 |
| 1,563,561 | Gasser | Dec. 1, 1925 |
| 1,572,484 | Homar | Feb. 9, 1926 |
| 1,754,223 | Crowell et al. | Apr. 15, 1930 |
| 1,850,693 | Sappington | Mar. 22, 1932 |
| 2,225,079 | Neal | Dec. 17, 1940 |
| 2,238,786 | Warman | Apr. 15, 1941 |
| 2,808,130 | Merritt | Oct. 1, 1957 |

FOREIGN PATENTS

| | | |
|---|---|---|
| 912,553 | France | Apr. 29, 1946 |